R. HOLMES AND A. O. ABBOTT, Jr.
METHOD AND APPARATUS FOR CUTTING PLASTIC MATERIAL.
APPLICATION FILED FEB. 26, 1920.
1,379,627.
Patented May 31, 1921.
5 SHEETS—SHEET 1.
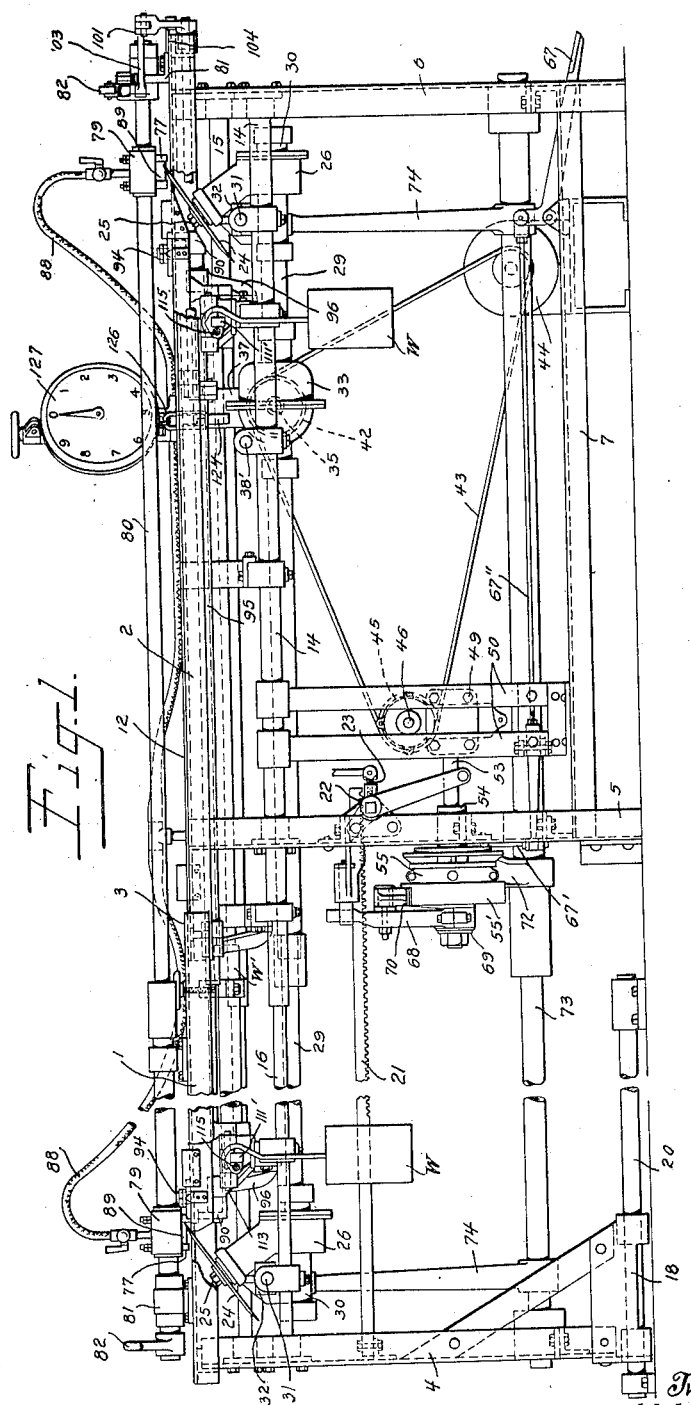
Inventors,
Rudolph Holmes and
Adrian O. Abbott Jr.,
By their Attorney.

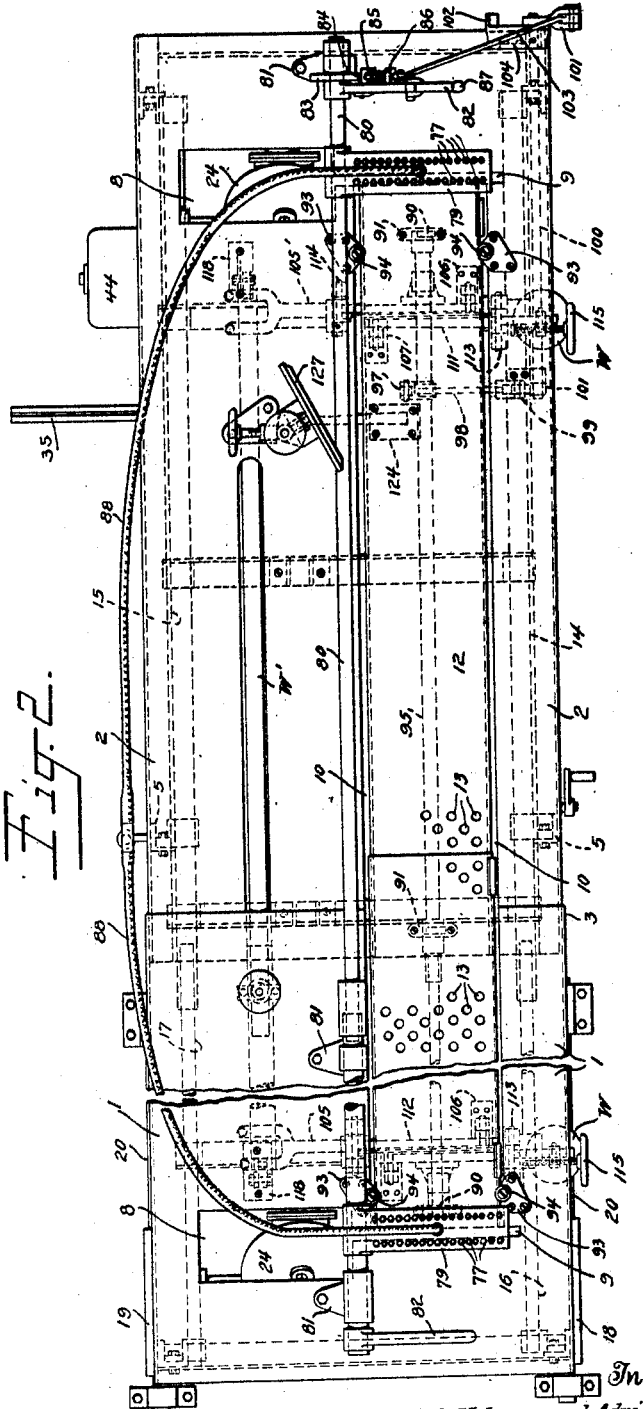

R. HOLMES AND A. O. ABBOTT, Jr.
METHOD AND APPARATUS FOR CUTTING PLASTIC MATERIAL.
APPLICATION FILED FEB. 26, 1920.
1,379,627.
Patented May 31, 1921.
5 SHEETS—SHEET 3.
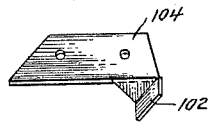
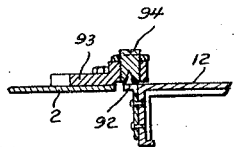
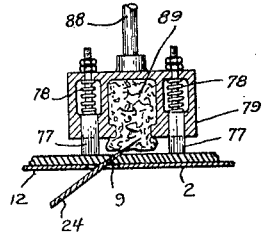
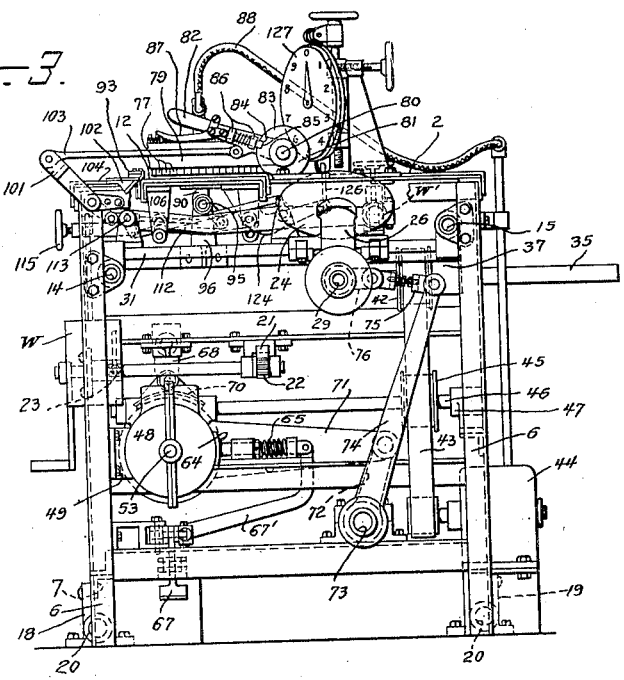
Inventors,
Rudolph Holmes and
Adrian O. Abbott Jr.,
By their Attorney. Ernest Hopkinson

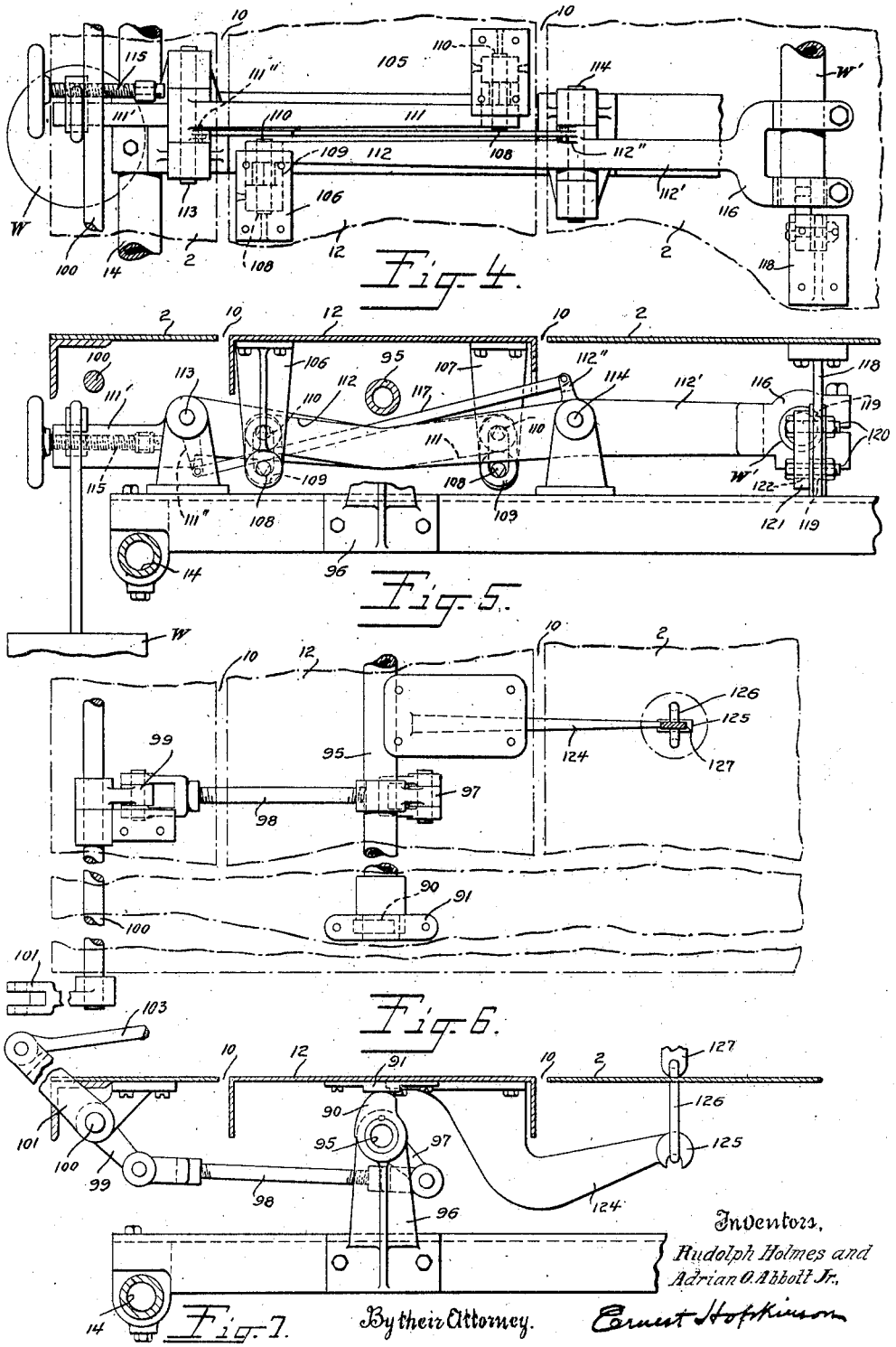

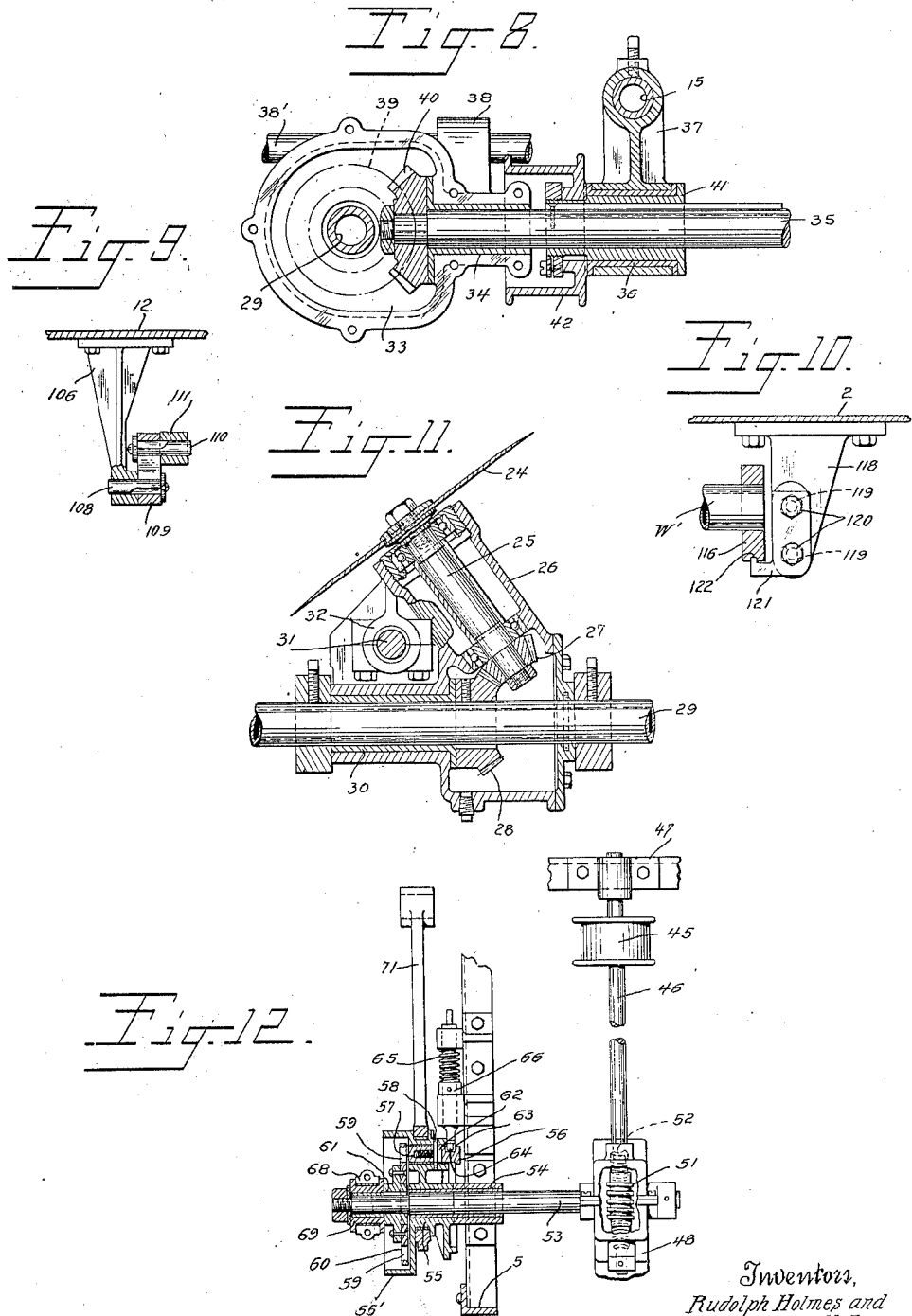

UNITED STATES PATENT OFFICE.

RUDOLPH HOLMES AND ADRIAN O. ABBOTT, JR., OF DETROIT, MICHIGAN, ASSIGNORS TO MORGAN & WRIGHT, A CORPORATION OF MICHIGAN.

METHOD AND APPARATUS FOR CUTTING PLASTIC MATERIAL.

1,379,627. Specification of Letters Patent. Patented May 31, 1921.

Application filed February 26, 1920. Serial No. 361,474.

*To all whom it may concern:*

Be it known that we, RUDOLPH HOLMES and ADRIAN O. ABBOTT, Jr., both citizens of the United States, residing in Detroit, county of Wayne, and State of Michigan, have invented new and useful Improvements in Methods and Apparatus for Cutting Plastic Material, of which the following is a full, clear, and exact description.

This invention relates to a method of and machine for cutting strips to length and weighing them and especially to machines for cutting and weighing plastic materials such as tire treads.

Heretofore in the manufacture of tire treads it has been customary to cut them accurately to length by hand, to then roll the treads up into a small bundle and weigh them on an ordinary platform scale, and finally to unroll the treads and place them between fabric, the last named operation being termed booking. The present invention aims to improve the method of handling, cutting and weighing plastic materials, and particularly plastic tire treads. It also contemplates a new machine for accurately and economically cutting strips of plastic and the like materials to a desired length. Still further it comprehends a machine which permits of cutting and weighing lengths of material with a minimum amount of labor.

The invention contemplates a method of handling sheet material and particularly tire treads which consists in shaping stock in a desired cross-section, cutting the stock roughly to size, and supplying the strips to a machine. Operators at the machine remove the roughly cut strip and place it on a section of the table which may be converted into a scale pan of a balance. After being positioned upon this section of the table the ends are held and cut. Then, and preferably, without lifting, the accurately cut strip is weighed. And finally it is manually lifted and placed between the leaves of a book.

The combined cutting and weighing machine comprises briefly a telescopic or extensible table having a section or platform normally functioning as a support but convertible into a movable and counterbalanced scale pan or platform, being suitably connected up with weight indicating mechanism. Circular knives are arranged at an angle, preferably acute, to the table adjacent the ends of the scale pan or weighing section thereof, and means are provided for moving the knives without interrupting their rotation across the ends of the strip to sever them at an angle.

These are the objects of our invention, and other objects thereof will appear in the following detailed description of the accompanying drawings in which:

Figure 1 is a side elevation of the machine;

Fig. 2 is a plan view thereof;

Fig. 3 is an end elevation at the right of Fig. 1;

Figs. 4 and 5 are details in bottom plan and vertical section respectively showing the weighing mechanism;

Figs. 6 and 7 are bottom plan and vertical sectional views respectively of further details of the weighing mechanism;

Fig. 8 illustrates in vertical section a part of the knife driving mechanism;

Figs. 9 and 10 show in vertical section details of the weighing mechanism;

Fig. 11 illustrates in vertical section knife supporting and rotating mechanism.

Fig. 12 illustrates in horizontal plan partly in section a single revolution clutch mechanism which governs the transverse movement of the knives;

Fig. 13 illustrates a stop plate;

Fig. 14 illustrates in vertical section one of four pins and sockets for centering the platform relative to the table, and Fig. 15 represents in vertical cross-section the construction of plungers in the presser devices at opposite ends of the table.

In the embodiment of the invention illustrated in the accompanying drawings, and referring to Fig. 1 particularly, the frame is shown as consisting of table sections 1 and 2 telescoped together as indicated at 3 and supported by braced pairs of legs 4, 5, and 6, the latter two being also braced longitudinally as indicated at 7. The table sections 1 and 2 are of substantially duplicate construction each being provided adjacent one end with large L-shaped openings portions of which are indicated by the numerals 8, 9 and 10, the portions 10 being in registration and adapted to receive a platform 12 made in two sections like the table, the portions 8 being adapted to receive the cutting knives 24 to one side of the work, and the portions 9 allowing the knives 24 to be run transversely across the ends of the strips. Housings or guards (not shown) are normally positioned over the openings 8 to cover the knives 24. The platform 12 is preferably, but not necessarily, provided with perforations 13 to lessen its weight. The ends of the platform 12 define or form a continuation of one side of the slots 9 at each end of the table. Tubular tie rods 14 and 15 are provided below and at opposite sides of the table section 2 between the pairs of legs 5 and 6 and their projecting hollow free ends are adapted to receive brace rods 16 and 17 connected to the pair of end legs 4 which are slidably supported by sleeves 18 and 19 embracing horizontal rods 20 securely fastened to the floor and arranged parallel to the rods 14 and 15. By means of a rack 21 and crank operated pinion 22 the table section 1 may be shifted relative to the table section 2 to vary the distance between the slots 9 at opposite ends thereof. When the table sections have been adjusted as desired the set screw 23 is operated to hold the pinion against rotation and thereby fix the length of the table.

Projecting through the cut away portions 8 are circular knives 24 which are suitably fixed to spindles 25 inclined to the plane of the table and operatively supported in casings 26. The mechanism for driving the spindles 25 is substantially identical, and a description of one will suffice for the other.

On each spindle 25 is a bevel gear 27 which is driven by a similar gear 28 fast on a section of a telescoping shaft 29. The shaft 29 extends longitudinally nearly the full length of the table and its opposite ends are journaled in similar bearings 30, which are formed in and supported by the before-mentioned casings 26. Each of these casings 26 has a split collar 32 by which it is slidably supported on a cross bar 31 for movement transversely beneath the table so as to carry the circular knives from the openings 8 at one side of the table into the communicating openings 9 at the opposite side of the table. The longitudinal shaft 29 in bearings 30 at opposite ends of the machine prevents rotation of each casing 26 about the transverse supporting rods 31 and thus holds them upright.

Intermediate the two casings, the shaft 29 passes through a housing 33, see Fig. 8, which carries laterally a bushing 34 forming one bearing for a cross shaft 35 whose rear end is journaled in a second bearing 36, the two mentioned bearings being supported by hangers 37 and 38 which are sustained in any suitable manner by the stationary table section 2, the hanger 38 being slidable on a rigid cross rod 38' parallel to shaft 35. Mating bevel gears 39 and 40 operatively connect the shafts 29 and 35, which latter has feathered thereto a sleeve 41. A pulley 42 suitably fixed to the sleeve 41 receives a belt 43 driven in any suitable manner as by a motor 44. Through the above described connections the circular knives 24 are rotated continuously by connections permitting the knives to be shifted across the end of a strip of plastic material positioned on the platform 12 without interruption of their rotation.

The mechanism for shifting the knives transversely of the table will now be described.

The belt 43, see Fig. 1, is also looped about the pulley 45 fastened to a countershaft 46 arranged transversely of the frame, being supported at one side by a bracket 47 and at the opposite side of the frame by an extended portion of a housing 48 which is suitably bolted as indicated at 49 to vertically arranged bars 50. Adjacent the housing 48 the shaft 46 is provided with a worm 51, see Fig. 12, which through a worm wheel 52 in said housing drives a right angularly disposed stub shaft 53 which is journaled centrally in the housing and also in bearing 54 supported by the braced legs 5. As shown at the left of Fig. 12, shaft 53 has loose thereon an eccentric 55 which is apertured to receive a coupling pin 56 that is normally urged by an internally arranged compression spring 57 reacting against a cross pin 58 and impelling the coupling pin 56 into any registering one of a plurality of holes 59 provided in a circular plate 60 which is keyed as indicated at 61 to the shaft 53. The cross pin 58 passes loosely through the coupling pin 56 which is provided with an elongated slot 62 limiting displacing action of spring 57 so that the transverse channel 63 formed in the projecting end of coupling pin 56 may always be entered by the wedge-shaped end of a latch 64. The latch 64 is pressed by the resilient coil spring 65 thereabout which thrusts against a collar 66 fastened to the latch but is adapted to be shifted to disengage the latch 64 from the position shown in Fig. 12 by suitable connections 67', 67" to a treadle 67, see Figs. 1 and 3.

A pitman 68, see Fig. 3, is strapped about an auxiliary eccentric 69, see Fig. 12, on the free end of the stub shaft 53. The eccentric 55 has a lateral concentric flange 55', integral or otherwise fixed therewith, which is adapted to be engaged by a brake shoe 70, see Fig. 3, swiveled to the before-mentioned pitman 68. The preceding mechanism constitutes a one revolution clutch for thrusting and retracting an eccentric rod 71 which is pinned to a short arm 72 suitably fixed to a telescoping rock shaft 73 having any suitable number of rock arms 74 thereon. The arms 74 are each connected by a link 75, preferably adjustable by a species of turn buckle, to a boss 76 fixed to the casings 26 carrying the knives. But these rock arms 74 may be connected in any suitable manner to the longitudinally arranged shaft 29 which rotates the knives instead of being connected directly to the casings 26. It will thus be seen that by relieving pressure on the foot treadle 67 the latch 64 may be withdrawn to free the coupling pin 56 and start a single revolution of the eccentric 55 which through the connecting rod 71 will cause the rotating knife to move transversely of the table and back again to its starting position, it being understood that the wedge-shaped end of the arcuate latch enters the notch in the apertured end of the coupling pin 56 when the eccentric nears the end of a single revolution and automatically disengages the pin 56 to hold the knives in their retracted or starting position, and it being also understood that just about the end of a single revolution of the eccentric 55 that the auxiliary eccentric 69 will apply the brake shoe 70 to the flange 55 of the eccentric to arrest overthrow.

Means are provided at each end of the weighing platform or movable table section 12 to hold the ends of the material on opposite sides of the path of each knife. In the embodiment of the invention illustrated in the drawings this is effected by parallel rows of plungers 77, Fig. 15, urged yieldingly downward by springs 78 which react against the upper inner wall of a hollow box 79 which is suitably secured to a tubular rocker shaft 80, Fig. 2, journaled in brackets 81 fixed to the table sections 1 and 2. The rocker shaft 80 consists of telescoping feathered tubular sections and there are two of the boxes 79, one adjacent each of the knives. The rocker shaft 80 is provided at either or both of its ends with an operating handle or crank 82 fixed thereto adjacent a stationary plate 83 having a notch 84 in a suitable position to receive a spring pressed latch 85 in lugs 86 integral with the lever 82 and conveniently operated by a finger lever 87 pivotally mounted on the lever 82. The latch 85 is adapted to hold the hand lever 82 and consequently the boxes 79 in a position parallel with the table as shown in Fig. 3. In this position of the parts the spring operated plungers 77 thrust against the protruding ends of the material and hold them against lateral displacement during a cutting operation. It is desirable to lubricate the knives during a cutting operation and for supplying a suitable fluid, such as water, tubing 88 is connected to the hollow boxes 79 to convey water from a convenient source of supply to a strip of felt 89 positioned between the parallel rows of plungers 77 as shown in Fig. 15. The felt being constantly moist keeps the knife wet during the cutting operation.

During a cutting operation when the plungers 77 are yieldingly pressed down upon the ends of the strip, the platform or movable table sections 12 must be held rigid, or substantially so, and nearly flush with the flanking portions of the table. For this purpose cams 90, see Fig. 7, are arranged to thrust against wear-plates 91, suitably fastened to the under-side of the platform 12 at convenient positions between its ends. Adjacent each of its four corners the platform carries conical centering pins 92, Fig. 14, fitting into correspondingly shaped sockets in the lower ends of screws 94, carried by brackets 93, bolted to the relatively stationary sections 1 and 2 of the table. Two cams 90 are preferably provided in the locations illustrated in Fig. 2, and these cams are fixed to a tubular rock shaft 95 journaled in fixed brackets 96, Fig. 7, and at one end rocker 95 is provided with an arm 97 linked as indicated at 98 to a rock-lever 99—100—101, its fulcrum 100 being in the form of a rod which extends to one end of the table. A stop 102 on a plate 104, Fig. 13, anchored to the end of the table limits movement of the rock-lever-arm 101 when the cams 90 are disengaged from the under-side of the platform 12.

After the strip has been cut to length, it is weighed on the platform 12 which, for this operation, is freed by withdrawal of the cams 90 from the locking position shown in Fig. 7 and also by lifting the hollow boxes 79 and their plungers 77 away from the table, which is effected by a rotation of the handle 82 after disengagement of the spring latch 85. Link 103 connecting parts 82—101 permits these two operations to be performed simultaneously.

The platform 12 being free, the material thereon may be weighed by mechanism now to be described.

The weighing mechanism consists of a duplicate system of levers indicated generally in Fig. 2 at 105 and 105', the latter of which systems is illustrated in Figs. 4 and 5 in bottom plan and end sectional elevation respectively. Referring therefore to Figs. 4 and 5 one of these duplicate mechanisms is shown to consist of a pair of brackets 106 and 107 fixed to and depending from the platform at opposite sides thereof. Laterally and oppositely of brackets 106 and 107 project knife-edged-pins 108, see also Fig. 9, which are embraced by stirrups or endless links 109 which at their upper extremities rest on upwardly directed knife-edged-pins 110 fixed to the free ends of lever arms 111 and 112 which are fulcrumed at 113 and 114 respectively to fixed parts of the frame with arms 111' and 112' on the opposite sides of their fulcrums. To the lever arm 111' a counter-weight W is adjustably secured in any suitable manner as indicated at 115 for convenience in setting the balance to a zero position. And the lever arm 112' is provided in its free end with a yoke-shaped clamping collar 116 holding a counterweight W' in the form of a telescoping shaft which is similarly connected to the duplicate weighing linkage 105 at the opposite end of the platform 12.

Adjacent the fulcrums 113 and 114 each of the levers 111 and 112 is provided with oppositely extending arms 111'' and 112'' which are pinned to a link 117 which equalizes turning movement of the pairs of levers and maintains the platform 12 horizontal or substantially so.

Depending from the table sections is a bracket 118, see Figs. 5 and 10, having a pair of alined slots 119 adjustably receiving bolts 120 securing a J shaped member 121 to the bracket with its lower free end loosely engaging a notch 122 in the lower side of the split sleeve 116. This last named device for each of the weighing linkages prevents shifting of any part thereof axially with respect to the fulcrums 113 and 114, and does not interfere with the weighing operation of the linkages.

As shown in Fig. 7 a bracket 124 is fixed to the inner side of the platform 12 and its lateral free end 125 is connected by a link 126 or in any other convenient manner to a torsion-balance 127 of any suitable construction. The weights W and W' may be proportioned and adjusted as desired. When the platform 12 is unloaded, for instance, its surface may be located substantialy flush with the rest of the table top with the scale balance registering zero; but preferably, the platform 12 is overly counterbalanced when empty, so that slack in the weighing mechanism may be overcome and the drop under load reduced. In this latter case the necessary correction must be applied to or allowed for each reading. When, therefore, material such as a plastic tread length has been accurately cut to size, and after the plungers 77 and locking cams 90 have been moved away from said platform, the weight of the material of desired length is registered upon the scale dial without any further manipulation on the part of the operator.

Having thus described our invention, what we claim and desire to protect by Letters Patent is:

1. In the manufacture of tire treads from plastic rubber composition, shaping the treads to a desired gage, cutting to length slightly longer than desired, and simultaneously beveling their opposite ends substantially in parallelism and to the exact length desired.

2. In a machine for cutting and weighing strips of material, in combination, means for cutting the opposite ends of the strips, means for supporting the strips while being cut, and means including the last mentioned supporting means for weighing the strips.

3. A machine for cutting and weighing strips of material having in combination, lengthwise adjustable means for supporting strips intermediate their ends and accommodating different lengths thereof, means for cutting off the ends of each strip adjustable for different lengths thereof, and means for weighing the strips on the first mentioned means.

4. A machine for cutting and weighing strips of material having in combination, lengthwise adjustable means for suporting strips intermediate their ends and accommodating different lengths thereof, means for skiving off the ends of each strip adjustable for different lengths thereof, and means for weighing the strips on the first mentioned means without elevation after cutting.

5. A machine for cutting and weighing strips of plastic material having in combination, means for supporting strips intermediate their ends, spaced knives for severing the opposite ends of a strip, and adjustable means for operating said knives permitting their spaced relation to be varied to accommodate strips of different lengths, and means for weighing the strips on the first mentioned supporting means without necessarily handling the material after being cut.

6. In a machine for cutting and weighing strips of plastic material, means for supporting the strips between their ends, adjustable means for cutting the ends of a strip to any predetermined length, and means for weighing the strips without lifting them after cutting.

7. In a machine for cutting and weighing strips of plastic composition, in combination, a table having at least two relatively shiftable sections, knives fixed relative to each of the shiftable sections, means for operating said knives which permits shifting of said sections without alteration of the relation of each knife therewith to permit severance of strips in any desired length, a platform for supporting a strip with its opposed sides independent of the table, and means connected to said platform for permitting the strips to be weighed without removal therefrom.

8. In a machine for cutting and weighing strips of plastic composition, in combination, a table, a platform for supporting strips substantially in the plane of the table with its opposite sides free and clear thereof and of a length less than that of the finished strip, means for holding down one or both ends of the strips, means for cutting one or both ends of a strip, and means permitting strips on said platform to be weighed without removal therefrom.

9. In a machine for cutting and weighing plastic rubber composition, in combination, a table of variable length, a platform of variable length substantially co-planar with the table, knives arranged with their cutting edges operative beyond the end of said platform, means for moving said knives from a normal position clear of the ends of the platform past the ends of the same to sever the plastic, means for holding the opposite ends of each strip while being cut, and means for weighing the strips without removal from said platform.

10. In a machine for cutting and weighing plastic rubber composition, in combination, a table of variable length, a platform of variable length substantially co-planar with the table, knives arranged with their cutting edges operative beyond the end of said platform, means for moving said knives from a normal position clear of the ends of the platform past the ends of the same and returning the knives to their normal position not obstructing the introduction and removal of strips, means for holding the opposite ends of each strip while being cut, and means for weighing the strips without removal from said platform.

11. In a machine for cutting and weighing plastic rubber composition, in combination, a table of variable length, a platform of variable length and substantially coplanar with the table, circular knives arranged with their cutting edges operative at the ends of said platform, means for continuously rotating said knives, means for bodily moving said knives from a normal position clear of the ends of the platform past said ends, means for holding the opposite ends of each strip while being cut, and means for weighing the strip without removal from said platform.

12. In a machine for cutting and weighing plastic rubber composition, in combination, a table of variable length, a platform of variable length substantially co-planar with the table, knives arranged with their cutting edges operative beyond the end of said platform, means for moving said knives from a normal position clear of the ends of the platform past the ends of the same to sever the plastic, means for holding the opposite ends of each strip while being cut, releasable means for holding the platform rigid against the action of the means for holding the opposite ends of each strip, and means for weighing the strip without removal from said platform.

13. In a machine of the type described, in combination, a table having a plurality of relatively adjustable sections, knives adjacent the ends of the table, and means for moving said knives transversely of said table to sever the ends of strips supported thereby, said last named means including connections accommodating themselves to adjustment of the table sections.

14. In a machine of the type described, in combination, a frame, a platform supported by said frame and adapted in turn to support a strip between its ends, knives adjacent each end of said platform, and means for simultaneously cutting the projecting ends of a strip on said platform by relative movement between said knives and platform.

15. In a machine of the type described, in combination, a frame, a platform supported by said frame and adapted in turn to support a strip between its ends, knives disposed at an inclination to the plane of the platform adjacent its opposite ends, and means for simultaneously cutting the projecting ends of a strip on said platform by relative movement between said knives and platform.

16. In a machine of the type described, in combination, a frame, a platform supported by said frame and adapted in turn to support a strip between its ends, circular knives disposed at an angle to the platform adjacent its ends, means for rotating the knives, and means for simultaneously cutting the projecting ends of a strip on said platform by relative movement between said knives and platform.

17. In a machine of the type described, in combination, a table and platform having adjustable sections for varying their length to accommodate different sized strips, a circular knife adjacent each end of the platform, means for continuously rotating each knife, means for simultaneously cutting the projecting ends off from a strip supported on said platform by relative movement between it and the knives, said two last mentioned means including adjustable driving connections accommodating themselves to adjustment of the table sections.

18. In a machine of the type described, in combination, a table and platform having substantially co-planar adjustable sections, circular knives adjacent the opposite ends of the platform and arranged to cut at an angle thereto, means for continuously rotating the knives including slidable driving connections between the knives, and means for shifting the knives past the ends of the platform to simultaneously sever the projecting ends of a strip thereon without interruption of the rotation of the knives.

19. In a machine of the type described, in combination, a table and platform having substantially co-planar adjustable sections, circular knives adjacent the opposite ends of the platform and arranged to cut at an angle thereto, means for continuously rotating the knives including slidable driving connections between the knives, and means for shifting the knives past the ends of the platform to simultaneously sever the projecting ends of a strip thereon without interruption of the rotation of the knives, said last mentioned means including a telescoping mechanism conforming itself to alterations in the length of the table.

20. In a machine of the type described, in combination, a table and platform having substantially co-planar adjustable sections, circular knives adjacent the opposite ends of the platform and arranged to cut at an angle thereto, means for continuously rotating the knives including slidable driving connections between the knives, and means for shifting the knives past the ends of the platform to simultaneously sever the projecting ends of a strip thereon without interruption of the rotation of the knives each of said knives being supported beneath the table on a reciprocable carriage.

21. In a machine of the type described, in combination, a table and platform having substantially co-planar adjustable sections, circular knives adjacent the opposite ends of the platform and arranged to cut at an angle thereto, means for continuously rotating the knives including slidable driving connections between the knives, and means for shifting the knives past the ends of the platform to simultaneously sever the projecting ends of a strip thereon without interruption of the rotation of the knives each of said knives being supported beneath the table on a reciprocable carriage, said shifting means including a rock-shaft of self-variable length and having a plurality of arms articulated to said knife carriages.

22. In a machine of the type described, in combination, a table, a plurality of spaced circular knives each disposed at an angle to the plane of the table and slidably sustained therebeneath, means for reciprocating said knives transversely of the table, and means for rotating the knives including operatively connected intersecting shafts one of which is drivingly connected to each knife and the other of which is slidably sustained by the table and also driven from a suitable source of power.

23. In a machine of the type described, in combination, a table, spaced circular knives shiftably mounted therebeneath, each knife having an edge projecting at an angle above the table, means for shifting and continuously rotating said knives including parallel countershafts arranged transversely beneath the table, connections between said parallel countershafts and said knives, and a power operable device for rotating said knives.

Signed at Detroit, county of Wayne, State of Michigan, this 23rd day of February, 1920.

RUDOLPH HOLMES.
ADRIAN O. ABBOTT, Jr.